(12) United States Patent
Braun et al.

(10) Patent No.: US 11,932,150 B2
(45) Date of Patent: Mar. 19, 2024

(54) MOTOR VEHICLE SEAT ASSEMBLY

(71) Applicant: Kinetix AG, Chur (CH)

(72) Inventors: Michael Braun, Altensteig (DE); Michael Andreas Keller, Freudenstadt (DE); Wojtek Dyczka, Simmersfeld-Oberweiler (DE); Peter Spang, Waldachtal (DE)

(73) Assignee: KINETIX AG, Chur (CH)

( * ) Notice: Subject to any disclaimer, the term of this patent is extended or adjusted under 35 U.S.C. 154(b) by 0 days.

(21) Appl. No.: 17/862,514

(22) Filed: Jul. 12, 2022

(65) Prior Publication Data
US 2023/0048639 A1 Feb. 16, 2023

(30) Foreign Application Priority Data
Aug. 11, 2021 (EP) .................................... 21190788

(51) Int. Cl.
*B60N 2/90* (2018.01)
*B60N 3/00* (2006.01)
*B60N 3/08* (2006.01)
*B60N 3/10* (2006.01)

(52) U.S. Cl.
CPC ............... *B60N 2/90* (2018.02); *B60N 3/004* (2013.01); *B60N 3/08* (2013.01); *B60N 3/103* (2013.01)

(58) Field of Classification Search
CPC . B60N 2/90; B60N 3/004; B60N 3/08; B60N 3/103
USPC .................................................. 297/188.04
See application file for complete search history.

(56) References Cited

U.S. PATENT DOCUMENTS

| 9,278,648 B2 * | 3/2016 | Ackeret | ................... B60R 7/04 |
| 10,857,951 B2 * | 12/2020 | Shain | ...................... B60R 11/00 |
| 2012/0313404 A1 * | 12/2012 | Ackeret | ................. B60N 3/002 297/163 |
| 2017/0225624 A1 | 8/2017 | Fischer et al. | |

FOREIGN PATENT DOCUMENTS

| DE | 102009030895 A1 | 2/2010 |
| DE | 102015206262 A1 | 10/2015 |
| DE | 102014222672 A1 | 5/2016 |
| DE | 102019103872 A1 | 4/2020 |

OTHER PUBLICATIONS

German Search Report from Application No. 21190788.6 dated Feb. 3, 2022.

* cited by examiner

*Primary Examiner* — Mark R Wendell
(74) *Attorney, Agent, or Firm* — Dilworth & Barrese, LLP

(57) ABSTRACT

The invention relates to a motor vehicle seat assembly (10), having motor vehicle seat (12) and having at least one accessory (48) that can be fastened releasably to the motor vehicle seat, wherein the motor vehicle seat has a receiving bushing with insertion opening (30) for the releasable fastening of the accessory, and wherein the accessory has plug-in part (42) that can be inserted into the insertion opening of the receiving bushing, wherein the motor vehicle seat has at least one additional receiving bushing that is arranged offset with respect to the receiving bushing and has additional insertion opening (32), and wherein the insertion opening and the additional insertion opening are assigned insertion directions for plug-in part (44) and for the additional plug-in part that are parallel to one another and are directed in the same direction.

11 Claims, 4 Drawing Sheets

MOTOR VEHICLE SEAT ASSEMBLY

Figure 1:
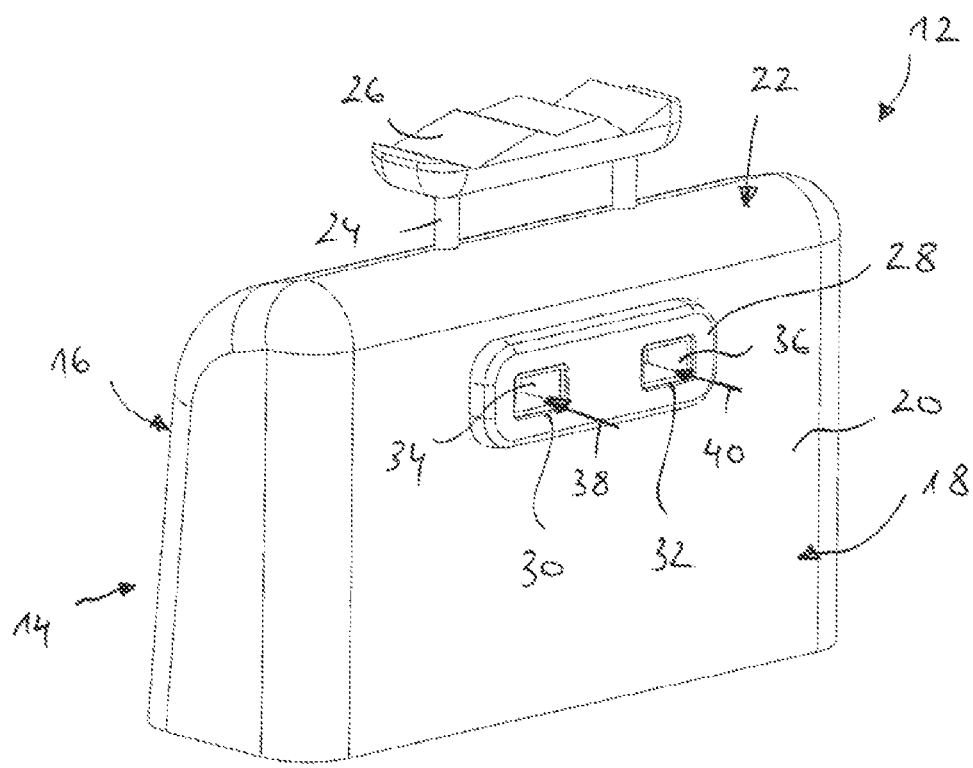

This application claims priority to European Patent Application No. 21190788.6-1012 filed on Aug. 11, 2021.

The invention relates to a motor vehicle seat assembly, having a motor vehicle seat and having at least one accessory that can be releasably fastened to the motor vehicle seat, wherein the motor vehicle seat has a receiving bushing with an insertion opening for the releasable fastening of the accessory and wherein the accessory has a plug-in part that can be inserted into the insertion opening of the receiving bushing.

Such a motor vehicle seat assembly is known—for the example with the motor vehicle manufacturer BMW—under the name of "Travel & Comfort System." This system enables flexible and simple fastening of various accessories to a motor vehicle seat; in practice, the system has also proven its worth due to its high level of user comfort and safety in the event of a crash.

The invention is based on the object of proposing a motor vehicle seat assembly of the type mentioned at the outset with an even greater variety of possible uses.

This object is achieved with a motor vehicle seat assembly of the aforementioned type in that the motor vehicle seat has at least one additional receiving bushing that is arranged offset with respect to the receiving bushing and has an additional insertion opening, and in that the insertion opening and the additional insertion opening are assigned insertion directions for the plug-in part and for an additional plug-in part that are parallel to one another and directed in the same direction.

The motor vehicle seat assembly according to the invention allows a plurality of plug-in parts to be connected to a motor vehicle seat at the same time, from the same side of the motor vehicle seat. In particular, access to the receiving bushing and the additional receiving bushing can be from a rear seat compartment of a motor vehicle in the direction of a rear side of a front seat.

It is preferable if the insertion opening and the additional insertion opening are arranged at the level of a common boundary surface of the motor vehicle seat. This enables simple and visually appealing integration of the at least two receiving bushings and their insertion openings on a motor vehicle seat.

It is possible that the receiving bushing and the additional receiving bushing are laterally offset from one another and/or vertically offset from one another. This enables the two receiving bushings to be used in a manner distributed over part of the width and/or height of a motor vehicle seat, i.e., along a horizontal, vertical or diagonal distribution axis of the receiving bushings.

In particular, it is preferred that the motor vehicle seat has a backrest and that the receiving bushing and/or the additional receiving bushing is or are arranged in the backrest. The backrest extends over a comparatively large area, so that the integration of at least one of the two receiving bushings can be carried out in this area without endangering the stability of the backrest. A backrest is particularly suitable for arranging the receiving bushing and the additional receiving bushing.

It is also possible that only one receiving bushing is arranged in the backrest and that another receiving bushing is arranged elsewhere on the motor vehicle seat. For this purpose, for example, a separate carrier for a receiving bushing may be considered, which is permanently fixed or repeatedly releasably fixed between two headrest rods of a headrest of the motor vehicle seat and has one of the two receiving bushings (i.e., the "receiving bushing" or the "additional receiving bushing").

Particularly for two receiving bushings that are arranged relatively close to one another (e.g., at a maximum distance of 20 cm from one another), it is advantageous if the insertion opening and the additional insertion opening are bounded by a common frame part on the seat side. This makes it easy to define the relative position of the two insertion openings.

A particularly preferred embodiment of the invention provides that the at least one accessory has the additional plug-in part, wherein the plug-in part of the accessory can be inserted or is inserted into the insertion opening of the receiving bushing and, at the same time, the additional plug-in part of the same accessory can be inserted or is inserted into the additional insertion opening of the additional receiving bushing. In this way, the same accessory can be fixed in two receiving bushings at the same time, creating a particularly stable assembly. The distance between the two receiving bushings helps to better absorb bending moments caused by the weight of the accessory via the plug-in parts and in the receiving bushings.

For a particularly stable structure of the accessory, it is suggested that the accessory has a bridge section from which the plug-in part and the additional plug-in part project, wherein a one-piece structure is conceivable, or also an interposition of further components (for example adapters or joints).

It is also preferable if the plug-in part and the receiving bushing can be releasably latched to one another by means of a latching connection, in order to ensure that the plug-in part is held securely in the receiving bushing. This applies in a corresponding manner if the additional plug-in part and the additional receiving bushing can be releasably latched to one another by means of an additional latching device.

Each of the aforementioned latching devices can, for example via positive-locking surfaces cooperating with one another as an undercut, be effective exclusively in a positive-locking manner (in such a case, it is preferred if an actuating section is provided for releasing the latching device). The aforementioned latching devices can also be effective, for example via wedge surfaces in contact with one another, in both a positive-locking and frictional-locking manner (in such a case, it is possible for the latching device to be releasable only by applying a corresponding pull-out force, wherein an actuating section need not be provided, but can be optionally provided).

In the case of two latching devices, it is preferred if the latching device and the additional latching device are motion-coupled to one another and if the at least one accessory has at least one actuating section, upon actuation of which the latching device and the additional latching device can be released simultaneously. This means that a mechanical positive locking, which is effective for a latching between a plug-in part and a receiving bushing in each case, is released by actuating an actuating section. In particular, it is conceivable that two actuating sections are provided, which can be actuated in opposite directions and transmit an actuating movement to different positive-locking elements of different latching devices in each case.

An additional embodiment of the invention provides that the additional plug-in part and the additional receiving bushing are connected to one another in a frictional-locking manner. This assembly can contribute to a particularly low-noise assembly (i.e., "without rattling"). At the same time, such an assembly makes it possible to absorb high bending moments.

In particular, it is preferred if the at least one accessory has a holder that is configured to hold an electronic device having a weight of 1 kg or greater. The possibility of fixing such an accessory in two receiving bushings at the same time means that relatively heavy electronic devices can now be held on a motor vehicle seat, although lighter devices can also be held on the holder if required.

In particular, the electronic device can be a laptop or a monitor.

The ability to absorb very high bending moments by means of two receiving bushings contributes to the high degree of crash safety of the motor vehicle seat assembly. In particular, the motor vehicle seat assembly is designed such that, when the accessory is inserted into the motor vehicle seat, the accessory remains attached to the motor vehicle seat in a non-destructive manner under an average acceleration of the accessory of 30 g occurring during a crash test. In a frontal or rear impact, the acceleration acts substantially along the longitudinal axis of the vehicle; in a side impact, it acts primarily along a transverse axis of the vehicle.

It is further preferred that the motor vehicle seat assembly comprises at least one accessory configured, for example, as a coat hook, a coat hanger, a table, a folding table, a storage or waste container, an umbrella holder or receptacle, a beverage holder, or a holder for a smartphone, a tablet computer or a camera. Such an accessory has one plug-in part each, or one plug-in part and one additional plug-in part, and can be connected to at least one of the two receiving bushings of the motor vehicle seat assembly depending on the number of plug-in parts.

Overall, the result is a very flexible and at the same time safe use of accessories of the motor vehicle seat assembly.

Further features and advantages of the invention are the subject of the following description and the graphic representation of a preferred exemplary embodiment.

Figure 2:
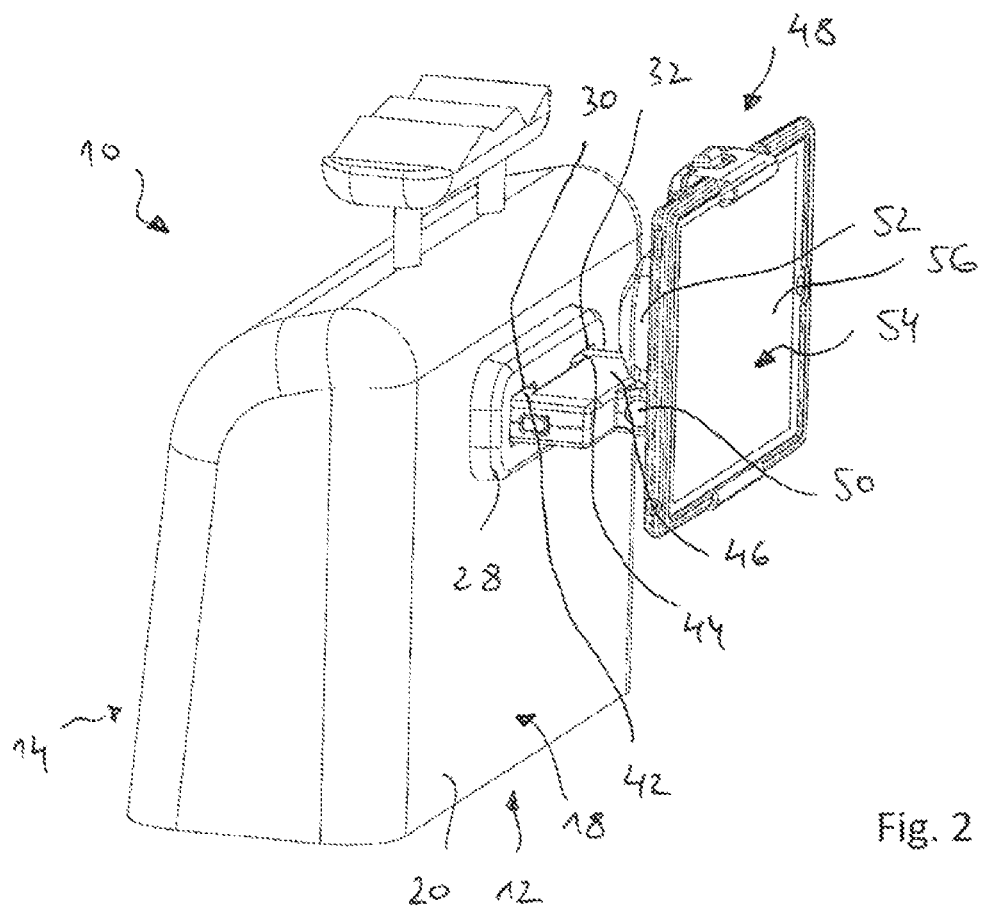
Figure 3:
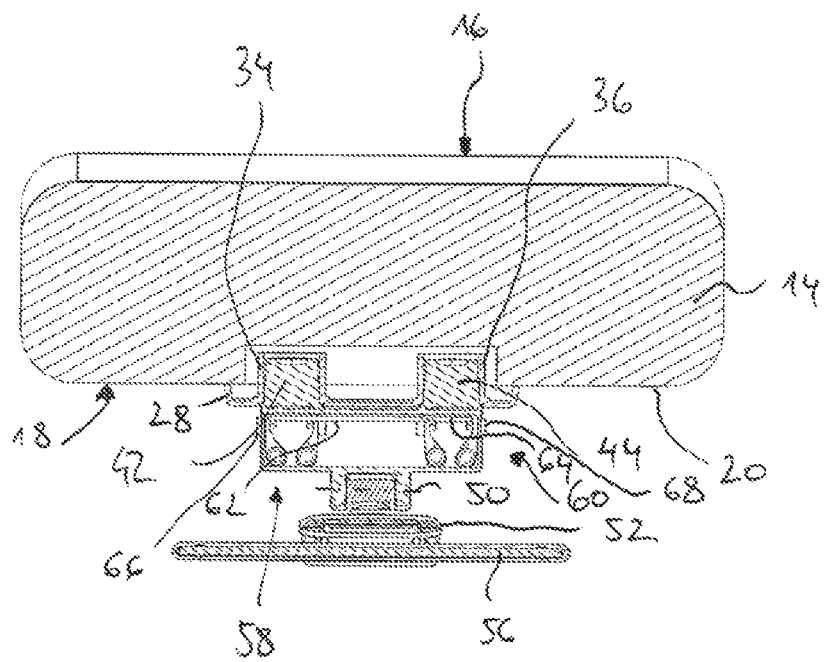
Figure 4:
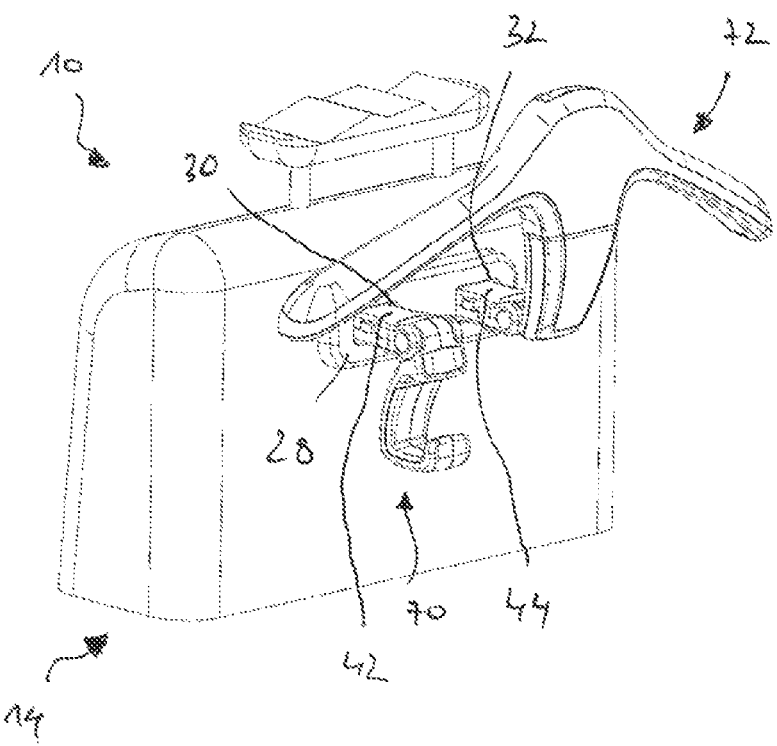
Figure 5:
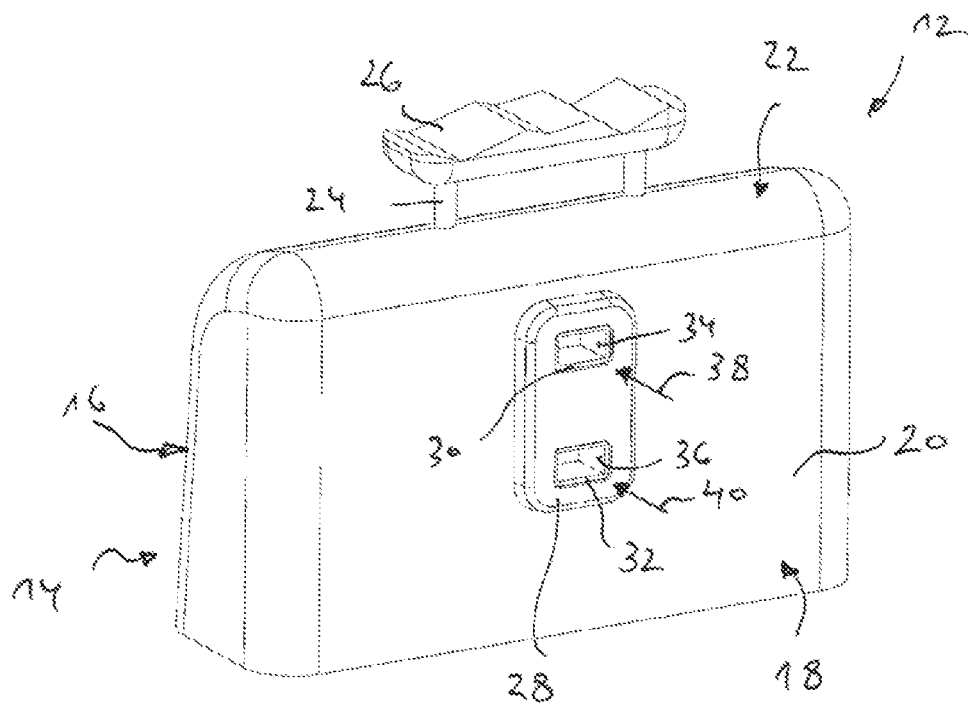
Figure 6:
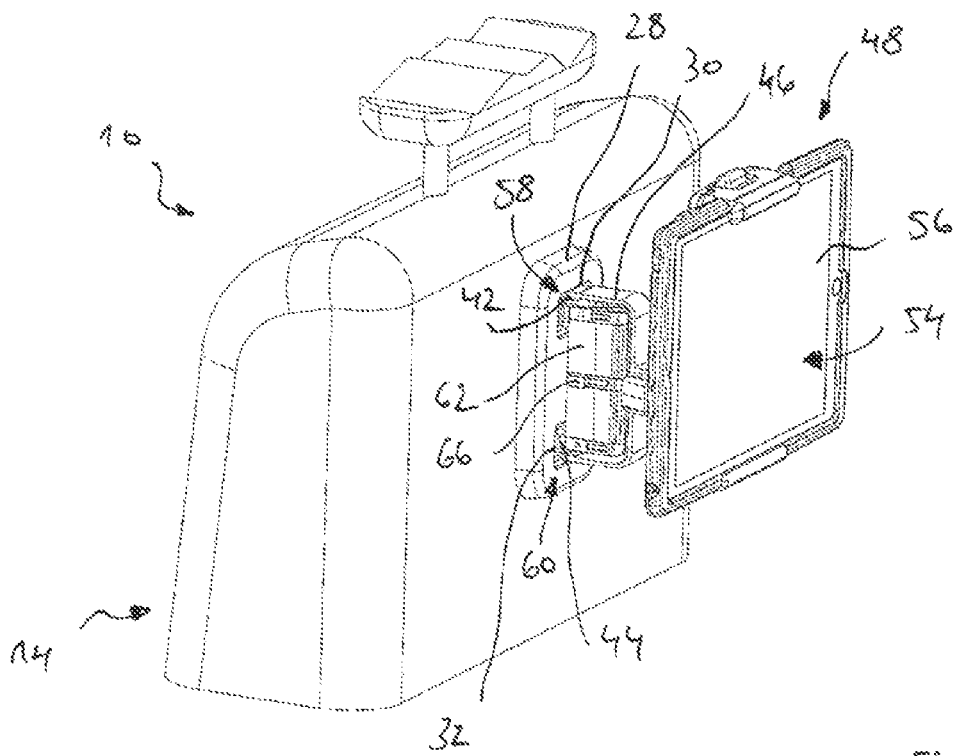
Figure 7:
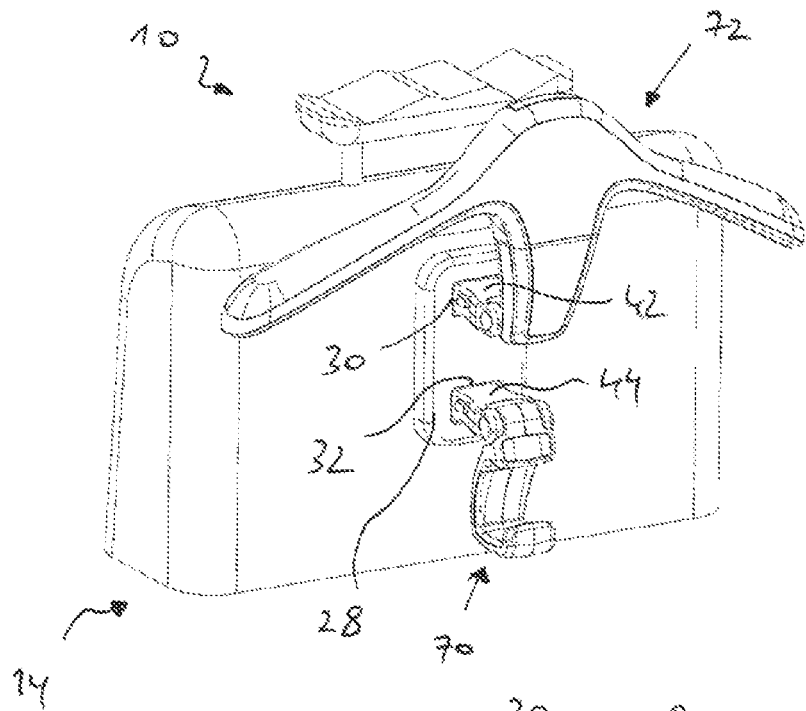
Figure 8:
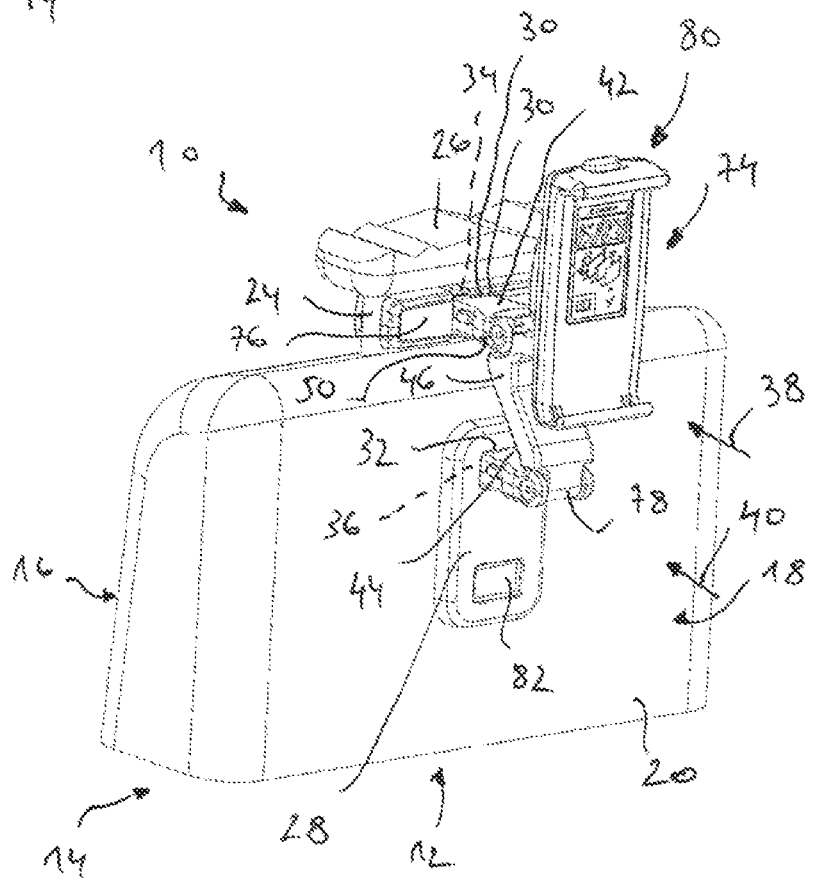

The Drawing Shows the Following:

FIG. 1 a perspective view of an embodiment of a motor vehicle seat;

FIG. 2 a perspective view of an embodiment of a motor vehicle seat assembly with a motor vehicle seat according to FIG. 1 and with an accessory;

FIG. 3 a horizontal section of the motor vehicle seat assembly according to FIG. 2;

FIG. 4 a perspective view of a motor vehicle seat assembly with a motor vehicle seat according to FIG. 1 and with additional accessories;

FIG. 5 a perspective view of an additional embodiment of a motor vehicle seat;

FIG. 6 a perspective view of a further embodiment of a motor vehicle seat assembly with a motor vehicle seat according to FIG. 5 and with an accessory exposed in sections;

FIG. 7 a perspective view of a motor vehicle seat assembly with a motor vehicle seat according to FIG. 5 and with additional accessories; and FIG. 8 a perspective view of an additional embodiment of a motor vehicle seat assembly.

A motor vehicle seat of motor vehicle seat assembly 10 shown in FIG. 2 is designated by reference sign 12 in FIG. 1.

Motor vehicle seat 12 has backrest 14, having front side 16 and rear side 18. Rear side 18 has boundary surface 20, which is formed, for example, by a trim or by a cover fabric of backrest 14.

In the exemplary embodiment shown in the drawing, backrest 14 extends to top surface 22. Two headrest rods 24 and headrest 26 (shown in sections only) are arranged above top surface 22.

With an embodiment not shown in the drawing, backrest 14 extends continuously into a head region (so-called integral seat with integrated headrest).

Frame part 28 is arranged at boundary surface 20, which has two openings, in the form of insertion opening 30 and in the form of additional insertion opening 32. Insertion opening 30 is allocated to receiving bushing 34, which extends from boundary surface 20 of backrest 14 in the direction of front side 16 of backrest 14. Additional insertion opening 32 is allocated to additional receiving bushing 36, which also extends from boundary surface 20 in the direction of front side 16 of backrest 14.

Preferably, receiving bushings 34 and 36 are identical to one another in terms of their dimensions.

Insertion directions 38 and 40, designated by arrows 38 and 40, are allocated to receiving bushings 34 and 36.

Insertion directions 38 and 40 are parallel to one another and are oriented in the same direction, in the illustrated exemplary embodiment starting from boundary surface 20 and moving in the direction of front side 16 of backrest 14. When backrest 14 is in the upright position, insertion directions 38 and 40 are aligned parallel to a longitudinal axis of the vehicle and can either both point forward in the direction of travel or both point rearward in the direction of travel.

In the exemplary embodiment shown in FIGS. 1 and 2, receiving bushing 34 and additional receiving bushing 36 are arranged laterally, i.e., offset from one another in the transverse direction of the vehicle.

Receiving bushings 34 and 36 each serve to receive a plug-in part, wherein a plug-in part assigned to receiving bushing 34 is provided with reference sign 42 in FIG. 2 and an additional plug-in part assigned to additional receiving bushing 36 is provided with reference sign 44.

Plug-in part 42 and additional plug-in part 44 each project from bridge section 46 that bridges the distance between receiving bushings 34 and 36 and that, together with plug-in parts 42 and 44, is part of an accessory designated overall by reference sign 48. With the illustrated exemplary embodiment, accessory 48 comprises joint 50 connected to the bridge section and holder 52 for electronic device 54, such as monitor 56.

To fix plug-in parts 42 and 44 in receiving bushings 34 and 36, latching device 58 allocated to plug-in part 42 and additional latching device 60 allocated to additional plug-in part 44 are provided, compare FIG. 3.

Two latching elements of each of two latching devices 58 and 60 are motion-coupled to one another via, for example, rod-shaped coupling elements 62, 64.

Coupling element 62 is connected to actuating section 66 arranged adjacent to plug-in part 42. Coupling element 64 is connected to actuating section 68 arranged adjacent to additional plug-in part 44.

By pressing on two actuating sections 66 and 68, in each case two latching elements of the total of four latching elements of two latching devices 58 and 60 can be actuated simultaneously, so that latching connections between plug-in part 42 and receiving bushing 34 and simultaneously between additional plug-in part 44 and additional receiving bushing 36 can be released.

Motor vehicle seat assembly 10 with receiving bushing 34 and additional receiving bushing 36 can also be used for plug-in part 42 and additional plug-in part 44, which are allocated to accessories 70, 72, which are designed, for example, as clothes hooks and/or as clothes hangers, compare FIG. 4.

An embodiment of motor vehicle seat assembly 10 shown in FIGS. 5 and 6 has a structure comparable to motor vehicle seat assembly 10 described above with reference to FIGS. 1 to 4. In contrast to the embodiment described above, receiving bushing 34 and additional receiving bushing 36 of the motor vehicle seat assembly according to FIGS. 5 and 6 are offset in height relative to one another. In all other respects, reference is made to the preceding description of FIGS. 1 to 4.

In the case of an arrangement of accessory 48 with two plug-in parts 42 and 44 and in the case of a height offset of receiving bushings 34 and 36, it is possible, deviating from the representation according to FIG. 6, to dispense with an additional latching device for the latching connection between additional plug-in part 44 and additional receiving bushing 36. In this case, it is advantageous to connect additional plug-in part 44 and additional receiving bushing 36 to one another only in a frictional-locking manner. Here, it is preferred if additional receiving bushing 36 is arranged below receiving bushing 34, so that a latching of accessory 48 to upper receiving bushing 34 takes place, wherein additional lower receiving bushing 36 and its frictional-locking connection with additional plug-in part 44 primarily serves to absorb bending moments. Such bending moments are due to the weight of electronic device 54 and accessory 48, and are transferred to additional receiving bushing 36 via additional plug-in part 44.

Moreover, motor vehicle seat assembly 10 according to FIGS. 5 and 6 enables flexible use for other accessories 70 and 72, compare FIGS. 4 and 7.

An embodiment of motor vehicle seat assembly 10 shown in FIG. 8 is also used to releasably fasten accessory 74.

Assembly 10 shown in FIG. 8 comprises carrier 76 that is releasably or permanently fixed between headrest rods 24 of motor vehicle seat 12. Carrier 76 has receiving bushing 34 with insertion opening 30.

Accessory 74 has plug-in part 42 that is connectable to receiving bushing 34, preferably via a releasable latching device.

Accessory 74 comprises additional plug-in part 44 connected to plug-in part 42 by bridge section 46.

Bridge section 46 is connected to plug-in section 42 via joint 50 and to additional plug-in section 44 via additional joint 78. Holder 80 protrudes from bridge section 46, which is configured to hold a smartphone, for example.

To arrange accessory 74 on motor vehicle seat 12, plug-in part 42 and additional plug-in part 44 are aligned parallel to one another and inserted into receiving bushing 34 of carrier 76 and into additional receiving bushing 36 of seat back 14 in mutually parallel and aligned insertion directions 38 and 40, where they are locked in place respectively.

For the case shown in FIG. 8, where backrest 14 is provided with two receiving bushings, such an assembly comprises third receiving bushing 82, that, in deviation from the representation in FIG. 8, enables use with an additional accessory, for example with accessory 70 or 72 according to FIG. 7.

The invention claimed is:

1. A motor vehicle seat assembly, comprising
a motor vehicle seat, and
an accessory releasably fastenable to the motor vehicle seat, wherein the motor vehicle seat has a first receiving bushing provided with a first insertion opening for releasably fastening of the accessory,
the accessory has a first plug-in part insertable into the first insertion opening of the first receiving bushing,
the motor vehicle seat has an additional receiving bushing arranged offset with respect to the first receiving bushing and provided with an additional insertion opening,
the accessory has an additional plug-in part insertable into the additional insertion opening,
the first insertion opening and the additional insertion opening are arranged with insertion directions for the first plug-in part and for the additional plug-in part parallel to one another and in the same direction, and additionally comprising
a first latching device for releasably latching the first plug-in part and the first receiving bushing to one another,
an additional latching device for releasably latching the additional plug-in part and the additional receiving bushing to one another,
the first latching device and the additional latching device are motion-coupled to one another, and
the accessory has an actuating section, upon actuation of which, the first latching device and the additional latching device are released simultaneously.

2. The motor vehicle seat assembly of claim 1, wherein the first insertion opening and the additional insertion opening are arranged at the level of a common boundary surface of the motor vehicle seat.

3. The motor vehicle seat assembly of claim 1, wherein the first receiving bushing and the additional receiving bushing are arranged laterally offset from one another and/or vertically offset from one another.

4. The motor vehicle seat assembly of claim 1, wherein the motor vehicle seat has a backrest and the first receiving bushing and/or the additional receiving bushing is or are arranged in the backrest.

5. The motor vehicle seat assembly of claim 1, wherein the first insertion opening and the additional insertion opening are bounded by a common frame part on the seat side.

6. The motor vehicle seat assembly of claim 1, wherein the accessory has a bridge section from which the first plug-in part and the additional plug-in part both project.

7. The motor vehicle seat assembly of claim 1, wherein the additional plug-in part and the additional receiving bushing are connected to one another in a frictional-locking manner.

8. The motor vehicle seat assembly of claim 1, wherein the accessory comprises a holder configured to hold an electronic device having a weight of 1 kg or greater.

9. The motor vehicle seat assembly of claim 8, wherein the electronic device is configured as a laptop or monitor.

10. The motor vehicle seat assembly of claim 1, wherein the motor vehicle seat assembly is designed such that, when the accessory is inserted into the motor vehicle seat, the accessory remains attached to motor vehicle seat in a non-destructive manner under an average acceleration of accessory of 30 g occurring during a crash test.

11. The motor vehicle seat assembly of claim 1, wherein the motor vehicle seat assembly comprises at least one accessory configured as a coat hook, a coat hanger, a table, a folding table, a storage or waste container, an umbrella holder or receptacle, a beverage holder, or a holder for any one of a smartphone, a tablet computer or a camera.

* * * * *